A. Fuller,
Wood Molding Machine.
Nº 55,272.                    Patented June 5, 1866.

Witnesses
W. L. Fuller
J. Henry Hill

Inventor
Andrew Fuller
By his Atty
Thos. H. Dodge

UNITED STATES PATENT OFFICE.

ANDREW FULLER, OF MILFORD, NEW HAMPSHIRE.

IMPROVEMENT IN PLANING-MACHINES.

Specification forming part of Letters Patent No. 55,272, dated June 5, 1866.

*To all whom it may concern:*

Be it known that I, ANDREW FULLER, of Milford, in the county of Hillsborough and State of New Hampshire, have invented certain new and useful Improvements in Machines for Working Lumber Across the Grain; and I do hereby declare that the following is a full, clear, and exact description of the same, reference being had to the accompanying drawings, forming a part of this specification, in which—

Figure 2:
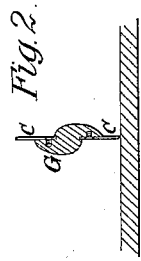
Figure 3:
Figure 1:
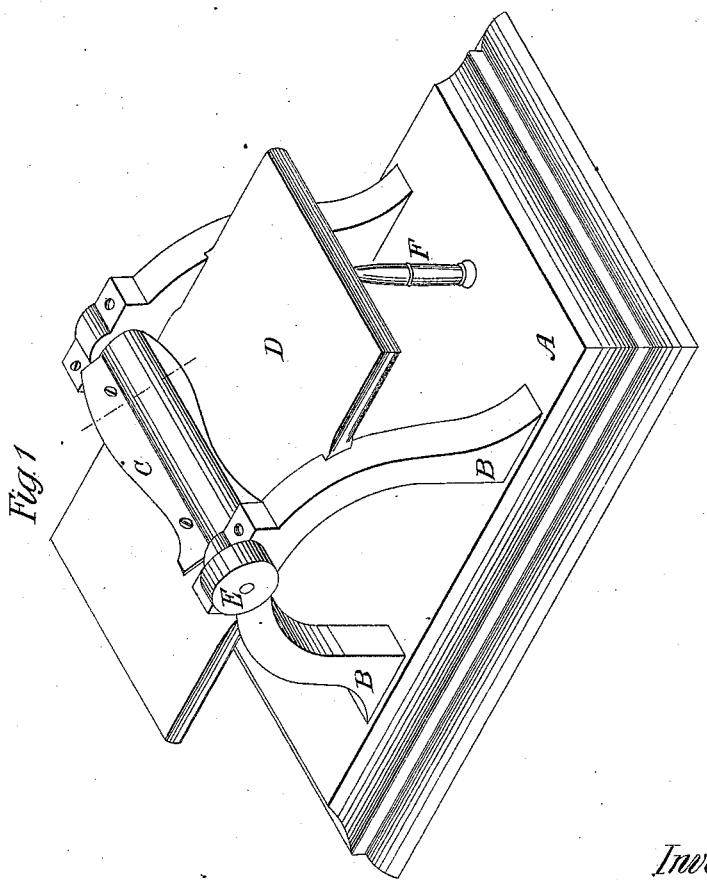

Figure 1 represents a perspective view of my improved machine. Fig. 2 represents a cross-section of the knife or scraper, as indicated by red line, Fig. 1; and Fig. 3 represents a piece of lumber after it has been worked by a machine constructed according to my invention.

In the drawings, A represents the base of the machine, and B the standards or bearings which support the cutter or scraper. C is the knife or scraper; D, the platform upon which the lumber rests while it is being worked. E is the wheel upon which the belt runs to give the knife or scraper a rapid rotary motion, and F is a standard which supports one end of platform D, which is also further supported by being let in at the sides to frame B.

Many attempts have been made to work lumber across the grain; but they have not proved successful, owing to the fact that all such attempts have been made with cutters placed upon their cutter-heads so as to operate upon the material similar to the cutters in a planing-machine. So difficult and unsuccessful has the undertaking proved that a certain class of fans, used extensively in this country, have all been imported, owing to the supposed impossibility of preparing or working the wood stock for handles by machinery, it being impossible to work it out by hand so as to compete with foreign labor. After repeated experiments I have succeeded in producing a machine by which the wood stock for the handles of paper fans can be worked with great rapidity and beauty.

In my machine the cutter or scraper C is placed upon the head G, so that a line drawn through the cutter when in a perpendicular position in relation to the platform or table (as shown in Fig. 2) will pass through the axis or center of motion both of the knife and its revolving head. The outer edge of the knife or scraper can, of course, be made in any desired form.

The operation of the machine is as follows: The material to be operated upon, with the grain parallel with the axis of motion of head G, is placed upon the platform D, and may be fed forward by any suitable mechanism. While the material is being fed forward under the cutter or scraper C a very rapid rotary motion is given to the head G and scraper C, whereby the fibers of the wood are worked off, not in chips or shavings, but in a state of fine powder. By this mode of operation the working of wood crosswise the grain is effected in a neat and expeditious manner.

In practice, where considerable quantities of material are to be worked up, it may be well to saw or cut the material up, and glue or otherwise fasten the edges of the pieces together, to expedite the operation of feeding and working the material.

Having described my improved mode of working lumber across the grain, what I claim as of my invention, and desire to secure by Letters Patent, is—

The method herein described of working lumber across the grain by the use of one or more rotary cutters or scrapers fixed or secured in the cutter-head G so that their planes shall pass through the axis of motion of the head G, in combination with a table or platform to support the lumber to be fed to the cutter, the whole being arranged and operating as shown in Fig. 2 of the accompanying drawings.

ANDREW FULLER.

Witnesses:
S. SMITH STICKNEY,
J. L. SPRING.